Sept. 5, 1933. E. B. MEYER 1,925,397
TRACK CLEARING IMPLEMENT
Filed June 3, 1932 2 Sheets-Sheet 1
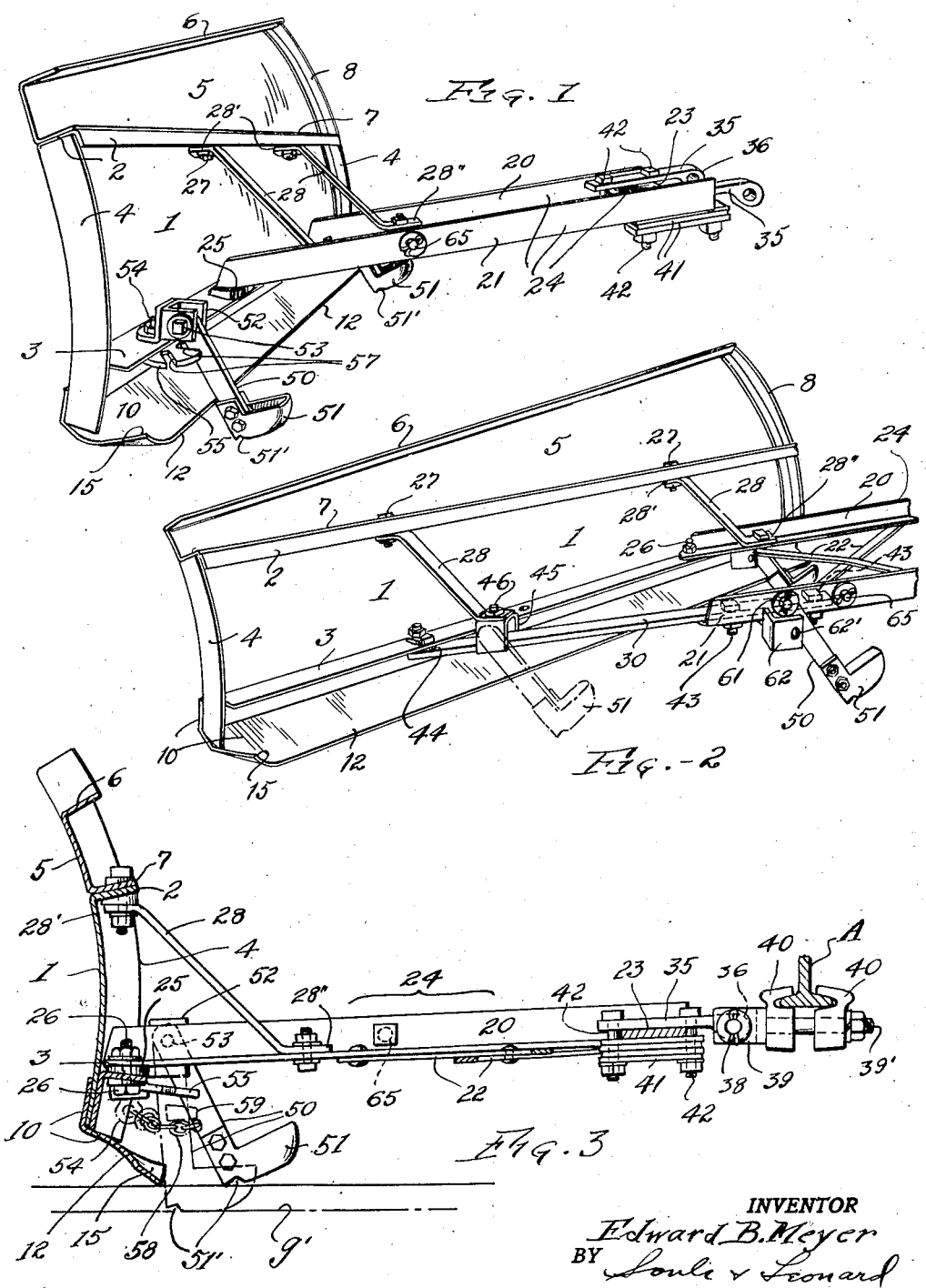

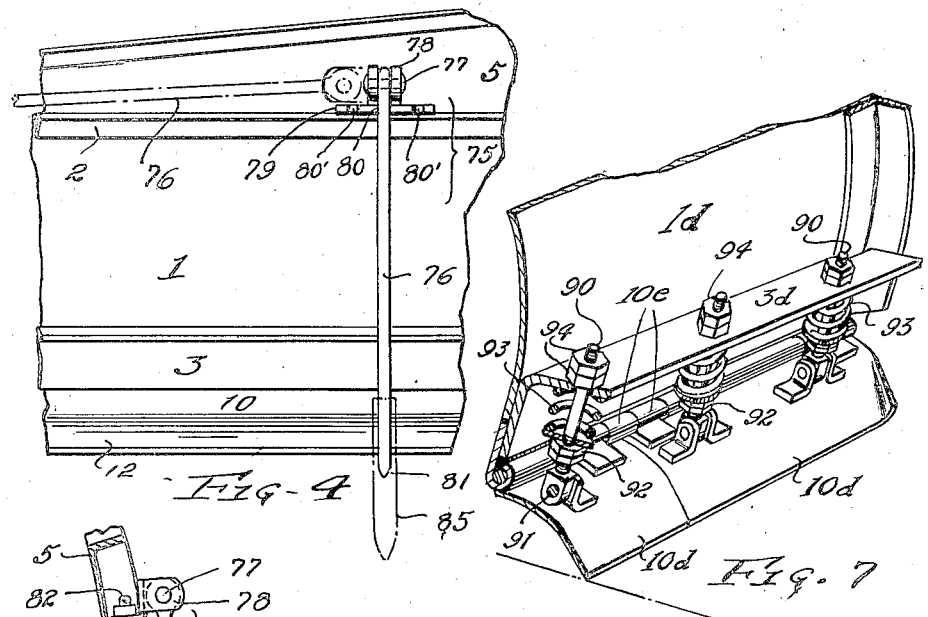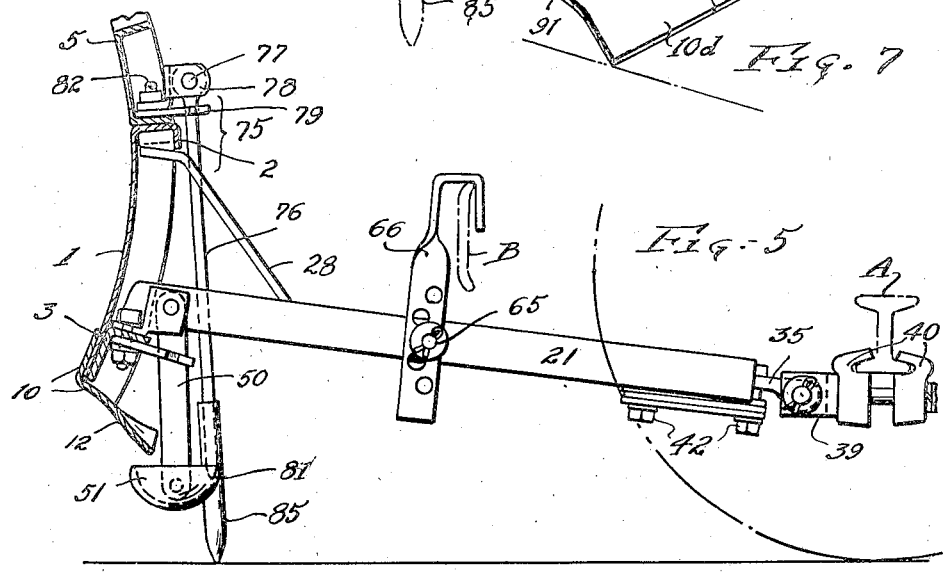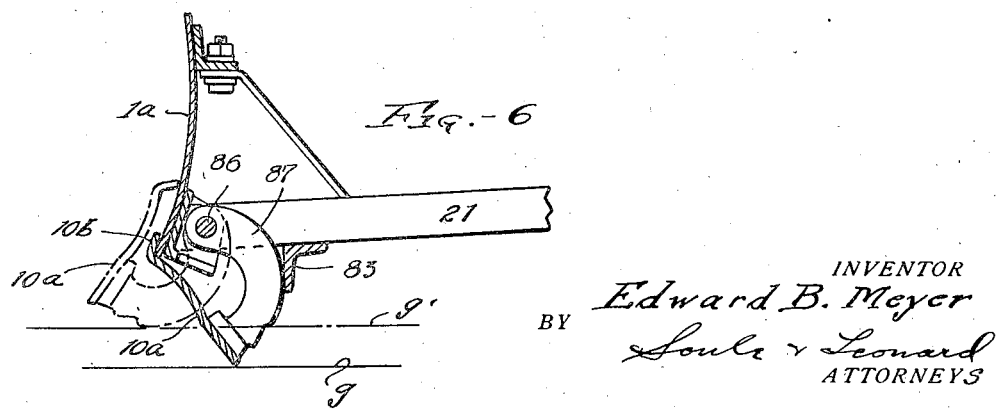

Patented Sept. 5, 1933

1,925,397

UNITED STATES PATENT OFFICE 1,925,397

TRACK CLEARING IMPLEMENT

Edward B. Meyer, Cleveland Heights, Ohio

Application June 3, 1932. Serial No. 615,109

25 Claims. (Cl. 37—42)

This invention relates to track-clearing equipment and particularly to an implement adapted for attachment to an automobile and arranged to function equally effectively both as an earth leveler or scraper and as a snow plow or shovel.

An object is to provide a track-clearing implement which will not dig into the track foundations, say into solid earth, yet which will scrape any loose materials therefrom clearly.

A further object is to provide a track-clearing implement which will ride over heavy stones embedded in the track, curbing and the like without damage to the implement or appreciable shock to the driving vehicle, and yet which will entirely clear the track of large volumes of loose materials thereon.

Another object is to provide an improved track-clearing implement which will operate to scrape the track cleanly when moved in one direction and which will automatically become elevated out of scraping contact with the ground when moved in the opposite direction.

A further object is to provide an effective and simple arrangement for lifting a track-clearing implement into carrying position on or with respect to a vehicle to which the implement is attached.

Other objects include the provision of a simpler and materially lighter but equally serviceable track-clearing implement of the type shown and described in my prior application, Ser. No 550,431, filed July 13, 1931.

Other objects and novel features of the invention will become apparent from the following description relating to the accompanying drawings, showing the preferred forms. The essential novel characteristics are summarized in the claims.

In the drawings, Fig. 1 is a perspective view showing one embodiment of the invention detached from the propelling vehicle, the moldboard being adjusted for "broadside" operation;

Fig. 2 is a perspective view showing substantially the same embodiment as Fig. 1, but with the moldboard adjusted for deflecting materials from the track to the right of the direction of movement of the moldboard and frame;

Fig. 3 is a longitudinal cross sectional view taken substantially centrally of the main frame and cutting the moldboard;

Fig. 4 is a detail fragmentary view showing particularly a suitable form of adjustable device for raising the moldboard when backing up and/or to carrying position;

Fig. 5 is a longitudinal cross sectional view of the implement showing particularly one operation of the device of Fig. 4 and preferred means for suspending the implement on the propelling vehicle;

Fig. 6 is a diagrammatic longitudinal sectional view similar to Fig. 3 of a modified arrangement wherein the ground-engaging portion of the moldboard is movably arranged, and Fig. 7 is a perspective view showing an arrangement in which yielding track contacting blades are provided.

Referring to the drawings, in Figs. 1 and 2 there is shown a main moldboard section 1 which is preferably sheet metal with suitable reinforcing flanges at its top and bottom edges, as at 2 and 3, and vertical edge reinforcing flanges 4. The reinforcing may comprise structural angles or may be effected by turning flanges on the sheet metal. As illustrated, the main section 1 has parallel top and bottom edges and in order that a single moldboard will be most effective for either right or left hand movement of the material to be cleared from the track, I preferably add a tapered top section 5 having upper and lower flanges 6 and 7 thereon, the flanges 6 or 7 being adapted to be selectively secured to the flanges 2 of the main section 1 as by suitable bolts. The flange 7 is attached (as shown) for moving the material to the right of the track being cleared, and for left hand operation, the blade section 5 is simply inverted and then attached by means of the flanges 6.

The wider end of the blade 5 may also be reinforced by a suitable structural angle member 8, and this end of the blade is preferably cut so that the angles of both corners are the same, whereby the adjacent edges of the two blade sections coincide in either position of the top section, i. e. with no overhang of one section past the other.

In cases where it is not desired to at any time convert the implement from a right hand to a left hand type, the main blade may be made from a single piece of sheet metal. This is not illustrated.

At the bottom edge of the blade section 1 is a track contacting blade 10 which may be made in as many sections as desired, or in one piece as shown, and which extends the entire length of the main blade section 1, below which the blade 10 turns rearwardly at 12, being curved to present a concave lower face, about as illustrated in Fig. 3. With the moldboard in normal position relative to the frame and vehicle, the trailing edge of the blade 10 makes an acute angle with the earth or track surface. As shown, this angle is about 35° and the peculiar operation of the bottom section in clearing the track in various conditions thereof will be hereinafter given more in detail. The extremities of the blade member 10 are preferably turned up, as at 15, to form end skid or skid guard surfaces by reason of which the blade is prevented from digging into the ground, particularly in turning corners.

For propelling the moldboard and supporting the same in generally upright position, with the retreating blade 10 extending at the desired angle, I provide pusher bars which for simplicity and lightness, may comprise two structural angle sections 20 and 21, these being preferably tied together by suitable diagonals 22 and, additionally, by a fairly heavy rear end cross plate 23 of flat rectangular section, as shown; the above parts forming a suitable pusher frame 24.

The frame 24 is comparatively rigid and while it will flex somewhat when detached from the moldboard, it is fully braced when attached, as will be seen from Fig. 1. The forward slightly upwardly bent ends of the pusher bars 20 and 21 rest on wedge-shaped washers 25 on the flange 3 of the moldboard section 1, the washers, flanges and the ends of the bars 20 and 21 being secured together by suitable bolts, such as indicated at 26. Both pusher bars shove directly against the reinforced lower portion of the moldboard, and suitable diagonal interchangeable stiffening braces or struts 28 are connected between the pusher bars and upper portions of the moldboard. These braces have bent portions 28' for bolts 27, vertically aligned with the bolts 26 and passing through suitable leveling washers and the flanges 2 and 7. Bent ends 28'' are similarly attached to the top sides of the horizontal flanges of the pusher bars. With both pusher bars substantially the same length and the moldboard attached, as shown in Fig. 1, the material to be removed from the track is simply pushed ahead of the moldboard—broadside operation—eventually, of course, spilling off at the ends of the moldboard.

For clearing the track by laterally moving as well as forwardly shoving the material to be moved, one of the pusher bars may simply be made longer than the other (not illustrated) to angle the moldboard in the desired direction. This does not provide for track clearing under as many conditions as may be desired, and I therefore prefer to use a device somewhat similar to that shown and described in my copending application above identified (and therein broadly claimed) for enabling angular operation on the material either to the right or to the left and broadside operation as well,—selectively. This device, as shown herein, consists in the provision of a removable strut 30 (Fig. 2) which is illustrated as securely fastened to and extending substantially in line with the pusher bar 21 and connecting the forward end of this bar with the flange 3 on the moldboard. In other words, the extension 30 is made to connect with the moldboard at substantially the same level as the pusher bar which remains directly connected therewith, and, at the same time, there is no elbow in the composite longer pusher bar such as would weaken it or cause it to bow downwardly under severe strain.

When the strut 30 is used, then the moldboard is simply swung horizontally about the vertically aligned connecting bolts 26 and 27 of one of the pusher arms, and corresponding diagonal brace 28 respectively, as a hinge. The other diagonal brace is detached from its pusher bar and reconnected to the extension or strut member 30, as will be hereinafter described.

At the rear portion of the frame, the cross bar 23 slidably carries attachment brackets 35 comprising, as shown, metal bars with eye formations 36 in their rearward ends adapted to be engaged by hinge pins 38 on similar brackets 39 mounted on say the front axle of an automobile. The brackets 39 are bifurcated, as shown, to embrace the respective brackets 35, and each has a bolt 39' passing through suitable registering openings in two clamping blocks 40, oppositely recessed to embrace and tightly hold the lower flange of the car axle—shown at A—, the bolt 39' having a suitable clamping nut engaging one of the blocks 40. Each bracket 35, as shown, lies on top of the cross piece 23 of the frame and directly underlying the cross bar 23 below the bracket members, there are a plurality of shims 41. The members 35 and shims 41 are perforated and are held together by suitable bolts 42, arranged to clamp the bracket assembly 35, etc., in any desired position of adjustment along the cross piece 23. Shims 41 may be taken off or added as desired, and the bracket 35 placed either above or below the cross bar in attaining the most advantageous angle of operation of the bars 20 and 21 with respect to the ground surface.

Since very often there is only one position on each end of the car axle at which the bracket 39 may be attached, adjustment of the bracket members 35 in a large number of positions is a valuable feature in adapting an implement such as herein shown to the various different makes of automobiles.

The pusher bars 20 and 21 normally incline downwardly from the attachment brackets of the car axle about as shown in Fig. 3 and it will be seen that whenever the moldboard is swung about the vertical hinge connection provided by one set of bolts 26 and 27 at the forward end of one of the pusher bars, the other bar if merely extended in a direct line would engage the moldboard considerably below the flange 3. The bar 30 however, though shown as a straight piece of rectangular section stock, rests on the slightly upturned front end of the horizontal flange of the bar 21 and is securely bolted to this flange (bolts 43) and the outward end of the bar thus passes directly adjacent but underneath the flange 3 on the moldboard. A suitable wedge-shaped washer 44 saves having to bend the rear end of the bar 30.

The rear end of the member 30 may, as a matter of choice, be bent, for example, into a gooseneck (not shown) and extend above the flange 3. The member 30 also preferably extends in a vertical plane in line with the pusher bar to which it is attached and is secured at a special bolt hole spaced outwardly along the moldboard from the point at which the moldboard normally attaches to this pusher bar, hence it will be further seen that, in operation, there is no tendency to bow the pusher member in any direction.

It would ordinarily be necessary to make special provision for bracing the upper portion of the moldboard when swung out as shown in Fig. 2. The necessity for special parts, however, may be obviated by providing a platform, such as that shown at 45 in Fig. 2 on the member 30 for supporting one of the bent ends 28' or 28'' of the brace 28 which is disconnected from the main frame in swinging the moldboard with reference thereto. Such platform has a suitable opening for receiving an attachment bolt 46 passing through one of the bent ends of the strut 28 and the upper portion of the platform. The strut 28 may extend to the moldboard in line with the strut 30 or may extend diagonally thereof (to save having to move the brace from its normal position on the moldboard in swinging the moldboard from broadside operating position to an angled position).

The strut member 30 may have suitable stiffening flanges thereon, but this ordinarily interferes with reversibility and I have found it more convenient to make the extension 30 merely of adequately heavy stock.

As the implement is driven forwardly, the blade 10 rides directly on the ground surfaces and scrapes it clean of any loose materials thereon. This may be soft earth, gravel, sand or snow. Ordinarily snow is best cleared when it has recently fallen, that is, before it has become "packed" or frozen into a more or less solid mass; otherwise the moldboard has a tendency to ride up on the snow, leaving a layer of snow on the track. In any event, the operation leaves an adequately hard and clean traction surface for the vehicle. I have found that in actual use when clearing surfaces of snow, gravel, cinders, etc., the concave forward or lower face of the portion 12 of the blade is highly important in that it appears to impart a rolling action to the material moved. Thus the material is maintained in constantly moving condition as the implement advances over the surface to be cleared. This activity of material between the blade 10 and surface being cleared is not confined to dry materials as the same activity is observed in moving wet snow and other materials when wet. The frame may, of course, be weighted in accordance with the condition of snow or other materials and I may provide a suitable box (not shown) for containing weighting material, such as stones or odd pieces of iron, which box may be supported in any convenient fashion, say on the horizontal flanges of the pusher bars and above the cross members 22.

Irrespective of what kind of surface the implement is driven over, it will never dig in when driven in a forward direction, due to the deflecting action of the blade portion 10, and, within reasonable limits, and assuming the implement is weighted according to the quantity or weight of material to be moved, the blade 10 will scrape down to the hard track surface. Upon backing up, however, it is obvious that the rearwardly turned blade 10 would ordinarily have a tendency to dig in. To prevent this, I provide a suitable number of pivoted skid-jacks in convenient position on the implement and preferably on the moldboard. Suitable forms of such skid-jacks and the preferred manner of mounting the same are shown in Figs. 1, 3 and 5. The skid-jacks are, as shown, pivoted legs 50 with shoes 51, the latter being arranged to trail slightly back of the lower edge of the moldboard blade portion 10, as shown in full lines in Figs. 1 and 3. The shoes are shown as notched at 51' back of the relatively sharp track contacting trailing edges thereof. When the vehicle is backed up, the shoes 51 dig in or snub against the ground or pavement surface and automatically raise the moldboard far enough from the ground to prevent damage thereto or to the track surface.

The pivotal supports for the skid-jacks may comprise adjustable bracket members 52, arranged to support pivots pins 53, the brackets 52 being clamped in adjusted position as by bolts 54 on the flange 3, for example. Directly below the brackets are shelf-like platforms 55, radially slotted as at 57 to receive the legs 50 in various positions of adjustment, determined by the position of the moldboard with reference to the direction of movement of the vehicle. The legs 50, for example, occupy the central slots, when the moldboard is positioned for broadside operation, but when angled to the left, the legs 50 will be positioned in the respective slots 57 which are to the left of the central slot—one shown in Fig. 1. This device permits the shoes 51 to trail with the planes of the legs 50 directly in the line of movement of the implement in any adjustment of the implement, minimizing possibility of side scraping of the shoes on the track and of bending of the legs 50.

A convenient stop is provided for the skid-jacks in the arrangement shown (see Fig. 3) by reason of the rear edge of the blade section 10, which rear edge engages the legs 50 when these are brought to upright positions, supporting the bottom edge of the moldboard an inch or so off the track. Incidently, the legs may be held in this position by any suitable device to enable the implement to be moved forwardly as well as rearwardly with the shoes 51 acting as skids or runners. For example, a suitable chain 58 may be secured to an eye at the bottom end of the attaching bolt 54 of the bracket 52, and arranged to engage the leg 50 beneath a suitable projection 50 thereon, (shown diagrammatically in Fig. 3 only).

Instead of securing the skid-jack devices to the moldboard, these may, of course, be secured to the frame bars 20 or 21 as shown in Fig. 2, and additionally, to the strut extension 30, as may be required (see broken lines in Fig. 2). Each skid-jack device may be simply pivoted at the side of the frame as on a suitable laterally extending pin 61, the leg portions of the skid-jacks swinging into the embrace of guiding channels 62 which, incidentally, may contain registering apertures (see 62') for locking pins (not shown) adapted to be thrust therethrough behind the forwardly swung legs 50, holding the latter in moldboard suspending position, enabling the latter to be shoved ahead clear of the track. The shoes in any case are preferably removably arranged at the lower ends of the legs 50 for replacement in the event of wear. The shoes may be mushroom-shaped and pivoted to the legs if desired,—see Fig. 5.

It is contemplated that the entire frame and mold-board may be carried without detachment from the propelling vehicle by suspending the frame from the usual bumper of the vehicle, and for this purpose the pusher bars 20 and 21 are equipped with studs 65, projecting laterally from the bars, the studs being arranged to be received by selected openings in the depending portions of suitable hooks 66 (see Fig. 5), arranged to extend over the top surface of the bumper B and down behind it a distance sufficient (when the depending portions of the hooks are properly attached to the frame bars) to prevent the implement from being jolted off while driving over very rough terrain. This device is fully described and is claimed in my prior application above identified, though not in the present combination.

In the method of operation of the implement, it will be seen that as the moldboard is propelled forwardly, either in broadside position or at an angle, the loose and not too tightly packed material on the track accumulates temporarily between the track and the rearwardly inclined portion of the blade section 10, being finally rolled and deflected forwardly by the curved underhanging surface of the section 10. Thus the material as it accumulates is delivered onto the main blade section 1 and thereby either carried along or discharged at one side of the track being cleared. Upon encountering abrupt obstructions, the section 10 will obviously be deflected upwardly and ride easily thereover, say such obstructions as large stones buried in the ground, low curbing, sidewalk edges, etc. The amount of material carried in the trough effect between the rearwardly extending portion of the blade section 10 and the ground is comparatively small, as the material is constantly rolled while in the trough, moving into the trough effect at the bottom and rolling out at the top. Meanwhile this active accumulation acts as a deflector on the relatively oncoming material, directing this immediately up onto the general moldboard surface—sections 1 and 5.

Adequate moldboard height is afforded at all points along the moldboard to take care of the material likely to accumulate at such points by reason of the top section 5. The moldboard is thus comparatively light in weight, though adaptable as a right or left hand deflecting snowplow or shovel for handling unusually deep snow.

The frame and moldboard in the proportion shown are light enough to be lifted by hand in attaching the hooks 66, but this operation may be rendered especially easy by the use of one or more prop devices 75 (one of which is illustrated in Figs. 4 and 5). This prop device consists of a leg or prop member 76 somewhat on the order of the skid-jacks 50—51, but adapted for a two-fold purpose. The device 75 ordinarily operates to assist the skid-jacks 50—51 in initially lifting the moldboard from contact with the ground in backing up, and, in addition may be adjusted or adapted to lift the implement to carrying height.

The prop (or props as the case may be) may be pivoted as at 77 on a suitable bracket 78, the latter being pivotally secured to a suitable shelf arrangement on the back side of the moldboard. As shown, a suitable shelf effect is afforded by a plate 79 surmounting the flange 2 of the moldboard section 1. The plate 79 has a central slot at 80 and radially extending slots at 80' for receiving the shank portion of the prop in three different positions of the moldboard, namely: positioned for broadside operation and angled to the right or to the left. The prop 76 has a spike end 81 which may trail on the ground and which becomes operative, upon backing of the implement, slightly before the skid-jacks 50—51 would normally become operative. The spike will naturally dig in before the friction surfaces of shoes 51, in any form shown, will take hold. It will be noted from Fig. 5 that the spike end of the prop 76 will clear the track when the shoes 51 are in operating position, wherefore the operation of the prop does not interfere with backing up, which it would if it lifted the full distance.

Since in most cases no assistance for the stilts 50—51 is required, it is often desirable that the prop device 75 be rendered entirely inoperative. The supporting arrangement makes this a simple matter, for the leg 76 upon loosening the attaching bolt 82 may be lifted out of contact with the slots 80 or 80' and swung around to the broken line position (resting on the flange 2, for example; see Fig. 4) and then locked by again tightening the bolt 82.

In its second function, the leg 76 of the prop device requires elongation and to effect this, any suitable adjustment may be provided. It is preferred, however, to supply an extension sleeve, such as indicated in broken lines at 85 in Fig. 4 and in full lines in Fig. 5, the sleeve being adapted to be slipped over the end of the leg member 76 only when it is desired to lift the implement to carrying position. Fig. 5 shows the implement lifted and the hooks 66 (one shown) hung over the bumper B of the vehicle and depending portions thereof attached to the pusher bars 20 and 21, the pins 65 each engaging one of several holes in the hooks, depending on the height to which the implement is desired to be carried.

The suspended position of the implement is not necessarily an inactive or inoperative position since very often deep snow may be effectively cleared by taking off a portion at the top as a first operation with the moldboard raised as suggested in Fig. 5, then lowering the implement and scraping clear to the ground.

The rearwardly extending ground-engaging moldboard section or sections may, of course, be fixedly or movably mounted on the main moldboard body. The above described modifications show this ground-engaging section fixed. In Fig. 6, I show diagrammatically the lowermost section, designated 10a, pivoted as on convenient shafts or pins 86 behind the main moldboard section 1a, the pivot connection including curved arms 87 leading from the pivot shaft or pins to the moldboard section 10a. Any suitable number of such curved arms 87 may be provided. The operating position of the section 10a is shown in full lines and it will be noted that the upper edge of the section 10a has a flange portion 10b overlapping the lower edge of the moldboard section 1a to insure operative continuity of the forward surfaces of the two sections. The flange may also comprise the rearward movement stop for the section 10a or may operate in conjunction with other suitable limit stop or stops—a cross member, such as 83, for example.

It will be seen that the blade section 10a scrapes clear to the solid track surface g as in the case of the fixed section 10, upon forward movement of the implement, irrespective of whether the moldboard is positioned for broadside use or at an acute angle to the direction of movement. When, however, the implement is backed up, then the section 10a rotates to the broken line position, allowing the whole weight of the implement to be supported on the curved arms 87 which then function as shoes or skids contacting the track surface g' with the section 10a elevated to the broken line position with respect to the ground surface. In this position, the flange 10b may again abut the main blade as a stop. Upon again going forwardly, the blade 10a rolls on the curved arms to operative position, as will be obvious. The ground-engaging surfaces of the arms 87 may be so shaped as to permit operation with the moldboard positioned for angular operation (per Fig. 2, e. g.) or separate supporting devices, either pivoted or fixed, may be used with the pivoted blade.

An auxiliary initial lifting device may be arranged on the modification shown in Fig. 6, for operation just the reverse of the operation of the prop device 75 shown in Figs. 4 and 5. This would insure the immediate operation of the curved arms 87 in readjusting the lower blade section or sections when the implement is driven forwardly after being backed up. This auxiliary device is not illustrated in connection with Fig. 6, but it will be seen that it may comprise simply a prop staff and supporting brackets, say according to Figs. 4 and 5, but so arranged that the spike end of the prop trails on the ground when the implement is being backed up, and digs into the ground, raising the moldboard a short distance, upon again going forwardly.

Referring to Fig. 7, this shows the main moldboard section at 1d, provided near its bottom edge with a plurality of track contacting blade sections 10d, hinged to the section 1d or parts thereof in any suitable way, as by the piano-hinge arrangement 10e. The flanged structural brace for the lower edge of the moldboard section 1d is present at 3d and may carry part of the hinge connection.

Each blade section 10d has a suitable number of spring devices which normally hold these blade sections 10d in the desired operating positions, which positions may, incidentally, be adjusted by the devices shown. Each section 10d may have one or more compression spring supporting rods 90, each pivoted at its lower end as at 91 on suitable brackets on the respective sections 10d, and extending loosely through suitable openings in the flange of 3d. Above the pivotal connection at 91, the rods 90 carry suitable shoulders for supporting the lower ends of suitable compression springs 93, the upper ends of which press constantly against the outwardly extending flange of the angle member 3d. As shown, the shoulders for the lower ends of the springs are provided by suitable nuts 92 threaded onto the rods 90 so that the rods may be raised and lowered with respect to the flange of 3d, thus changing the angle of the respective blade sections 10d relative to the track, but without changing the compressive effects of the springs. The upper ends of the rods carry suitable nuts 94 by which, in conjunction with the nuts 92, the rods 90 are raised and lowered as stated and locked in adjusted position.

Assuming the nuts 94 have been adjusted to such position on the respective rods that all the sections 10d align with each other and extend downwardly from the moldboard 1d at the desired track contacting angle, it will be seen that as the moldboard is propelled in convenient fashion, the track clearing action of the sections 10d in cooperation with the upper moldboard section 1d is substantially according to the description of operation of the forms shown in Figs. 1 to 6. In addition, it will be seen that whenever a solid obstruction in the track is encountered by any one of the sections 10d, this section will yield while the other sections will remain in full operating position and release none of their load.

It will be understood that in connection with the implement shown in Fig. 7, suitable arrangement of the skid-jacks, attaching and propelling equipment and other ancillary devices as hereinbefore described, may be used.

The blade 10 in the various forms shown is not referred to as a part of the moldboard, either in the above description or in the claims, though as a matter of choice this portion of the implement may be made integral with the moldboard proper; (not illustrated), and not as a separate or detachable blade section.

It should be noted that in the expression "engaging the surface to be cleared at an acute angle" and expressions similarly referring to the angle of incidence of the blade 10 with such surface, the operating angle is referred to; namely, the angle between the working face of the blade 10 and the ground, e. g.

I claim:

1. In an implement of the class described, a moldboard and means for supporting the moldboard in generally upright position, the lower edge of the moldboard being out of contact with the surface to be cleared, means associated with the moldboard for contact with such surface and for elevating material below the lower limit of the moldboard into the path of the moldboard, said surface contacting means being arranged when in operative position to engage irregularities on the surface to be cleared and to be lifted by engagement therewith over such irregularities while remaining in the same operative position.

2. An implement of the class described, comprising a moldboard, a blade associated therewith, said blade in operating position extending rearwardly toward the surface to be cleared at an acute angle and having its lower edge disposed below the horizontal plane of the lower limit of the moldboard, said blade being arranged relative to the moldboard in a manner to elevate material from such surface into the path of the moldboard.

3. In a surface clearing implement, a moldboard, means for pivotally attaching the moldboard to a vehicle capable of propelling the same, the lower edge of the moldboard being in spaced relation to the surface to be cleared, and means receding from the lower edge of the moldboard into substantially continuous contact with the surface to be cleared for elevating material from such surface into the path of the moldboard, said last named means forming a runner for lifting the moldboard about the pivot axis of its attachment, over irregularities in the surface to be cleared.

4. In a surface clearing implement, a moldboard, a supporting frame, means to pivotally secure the frame to a vehicle above the surface to be cleared and arranged to guide the moldboard for raising and lowering movement with respect to such surface, the moldboard having a downwardly and rearwardly inclined blade associated with the lower edge thereof and adapted to form with the surface to be cleared an acute angle, whereby material on such surface will be scraped clean from such surface and elevated onto the blade and the moldboard will be raised for riding over irregularities on such surface.

5. In an implement of the class described, a moldboard adapted to operate with its lower edge out of contact with the surface to be cleared, means for propelling the moldboard, and means to elevate material from said surface into the path of the moldboard, said elevating means comprising a blade device associated with the moldboard and extending downwardly below the horizontal plane of the lower edge thereof and forming an acute operating angle with said surface, said angle having a rearwardly disposed apex.

6. In an implement of the class described, a moldboard, means for pushing the moldboard including pusher arms adapted to be pivotally connected to the under carriage of an automobile behind the moldboard, and a downwardly extending rearwardly receding blade at the lower edge of the moldboard and continuing the surface thereof and forming with the surface to be cleared an acute angle.

7. An implement of the class described, comprising a moldboard, a pusher device connected with the moldboard and adapted to be pivotally secured to a motor vehicle, scraping means on the moldboard engaging the surface to be cleared at an acute angle, whereby said means will ride over abrupt projections on such surface while operating to scrape such surface, and means pivotally carried on the implement and arranged to trail on the ground during forward movement of the implement and to automatically lift the implement upon rearward movement thereof.

8. An implement of the class described, comprising a moldboard, pushing means for said moldboard to movably connect the moldboard with a motor vehicle for shoving the moldboard ahead of such vehicle, and ground-engaging means pivoted on said moldboard at the rear thereof and arranged to positively engage the surface to be cleared at an acute angle of incidence therewith upon initial rearward movement of the moldboard and to interlock with such surface and elevate the moldboard with relation to such surface.

9. In an implement of the class described, means to move material from a track and a movable support therefor adapted to secure said means in operating position on a vehicle, a supporting device pivotally secured to said means and adapted to swing downwardly on movement of said means in one direction and to then engage the track surface and maintain the said means clear of the track, and means cooperating with the supporting device and adapted upon initial movement of said means in said direction to positively engage the track surface and interlock therewith to initially raise the first named means.

10. Apparatus according to the next preceding claim wherein the supporting device comprises a skid, and the cooperating means comprises in effect a relatively sharp point carried on the skid and adapted to be moved out of contact with the track surface by the skid when the skid is moved to final supporting position.

11. An implement of the class described, comprising a moldboard, means to movably connect the moldboard with a motor vehicle forwardly of the latter for clearing a track in front of such vehicle, the moldboard being adjustably arranged with respect to said connecting means whereby the moldboard may extend at a plurality of angles relative to the direction of movement of the vehicle, and moldboard elevating means pivotally secured to said moldboard in a plurality of positions corresponding to the angular adjustment thereof relative to the connecting means whereby the elevating means will trail on the ground in the line of travel during forward movement of the implement and will automatically lift the moldboard upon rearward movement of the implement.

12. In an implement of the class described, a moldboard, means to connect the same to a vehicle to clear a track forwardly thereof, and a blade pivotally secured to the implement substantially at the lower edge of said moldboard and having an operating position forming an acute angle with the surface to be cleared, the apex of said angle being disposed rearwardly of the direction of operative movement of the implement.

13. In an implement of the class described, a moldboard, means to connect the same to a vehicle to clear a track forwardly thereof, track surface engaging and clearing means disposed to extend along said moldboard at the lower edge thereof, said means being pivotally mounted on said moldboard and swingable to an active position engaging the track surface at an acute angle having a rearwardly disposed apex, and to an inoperative position, and means on the implement to support the moldboard and said track surface engaging means above the surface to be cleared when the said clearing means is swung to the inoperative position.

14. In an implement of the class described, a moldboard, means to propel the moldboard over a surface to be cleared, a blade pivotally mounted at the lower edge of said moldboard and having an operative position with its forward face forming an acute angle with the surface to be cleared and an inoperative position wherein the said edge is raised out of contact with such surface and means to engage such surface and support the moldboard during travel thereof when the said blade is in the inoperative position.

15. In an implement of the class described, a moldboard, pusher means to connect the moldboard to a vehicle forwardly of the latter, a ground-engaging blade pivotally mounted at the lower edge of said moldboard and having an operative position wherein the blade recedes from the lower edge of the moldboard and an inoperative position forwardly of the operative position, and means on said blade arranged to automatically engage the ground as a skid when the said blade is in the inoperative position thereof.

16. In combination, a motor vehicle, a track clearing implement including a moldboard, pusher means therefor adapted to be pivotally connected with the vehicle, means on the vehicle adapted to suspend the moldboard in a carrying position off the ground, and a jack device pivotally secured to the implement rearwardly from the moldboard and arranged to engage the ground when the moldboard is pulled rearwardly by the vehicle, to raise the moldboard to such carrying position.

17. The combination according to claim 16, wherein the jack device is swingable to a carrying position on the moldboard, clear of the ground.

18. An implement of the class described, comprising a moldboard, a pivotally mounted ground engaging blade disposed at the lower edge of the moldboard and in downwardly receding position relative thereto, yielding means tending to rotate the receding blade downwardly toward the track, and a limit stop device to definitely restrain the action of said yielding means whereby the blade is held in a normal operating position while being permitted to rise over obstructions on the track and be returned by said resilient means to said operating position.

19. Mechanism according to claim 18, wherein there are a plurality of separate ground engaging blade sections, each in a respective different position along the lower edge of said moldboard.

20. An implement of the class described, comprising a moldboard, a ground engaging blade disposed substantially at the lower edge of the moldboard, and means to pivotally support the blade, means cooperating with the blade to hold the same in an operating position such that it forms an acute angle with the surface to be cleared, which angle has its apex disposed rearwardly of the direction of operative movement of the implement, said last named means including resilient means to permit the blade to move on its pivotal support in one direction from said operating position.

21. In an implement of the class described, a moldboard, means to support and propel the same, a blade section movably supported substantially at the lower edge of the moldboard and having an operating position forming with the surface to be cleared an acute angle, and means to adjust the blade section with reference to the moldboard to vary such angle.

22. In an implement of the class described, a moldboard and means to propel the same over the surface to be cleared, and a blade section disposed at the lower edge of the moldboard and continuing the working surface thereof rearwardly and downwardly, and forming when in normal operating position, an acute angle with such surface to be cleared.

23. In an implement of the class described, a moldboard, means to propel the same over a surface to be cleared, and a blade associated with the moldboard, the acting face forming, in the operating position of the blade, an acute angle with the surface to be cleared, said acting face being concave to impart a rolling action to material engaged thereby, the foremost portion of the blade being disposed with relation to the forward surface of the moldboard in a manner to discharge material from said acting surface into the path of the moldboard.

24. In a snow moving implement, a moldboard, a mounting therefor including means to dispose the moldboard in angular relation to the direction of movement of the moldboard for right and left hand operation selectively, a tapered upper moldboard section adapted to be reversibly secured to the moldboard to increase the height thereof at the discharge end of the moldboard in either position of operation thereof aforesaid.

25. In an implement of the class described, a moldboard and frame, the frame including pusher bars and a cross connecting member therefor, pivot brackets adapted to be supported by a motor vehicle in transversely spaced relation thereon, cooperating pivot members adapted to be adjustably clamped on said transverse member of the frame in spaced relationship corresponding to any spacing of the bracket members on the vehicle within predetermined limits.

EDWARD B. MEYER.